US010175379B2

(12) United States Patent
Hibbs

(10) Patent No.: US 10,175,379 B2
(45) Date of Patent: Jan. 8, 2019

(54) SYSTEM AND METHOD FOR SURVEYING A SUBSURFACE OF THE EARTH

(71) Applicant: GroundMetrics, Inc., San Diego, CA (US)

(72) Inventor: Andrew D Hibbs, La Jolla, CA (US)

(73) Assignee: Groundmetrics, Inc., San Diego, CA (US)

(*) Notice: Subject to any disclaimer, the term of this patent is extended or adjusted under 35 U.S.C. 154(b) by 262 days.

(21) Appl. No.: 15/033,237

(22) PCT Filed: Nov. 11, 2014

(86) PCT No.: PCT/US2014/064916
§ 371 (c)(1),
(2) Date: Apr. 29, 2016

(87) PCT Pub. No.: WO2015/073393
PCT Pub. Date: May 21, 2015

(65) Prior Publication Data
US 2016/0282501 A1 Sep. 29, 2016

Related U.S. Application Data

(60) Provisional application No. 61/904,756, filed on Nov. 15, 2013, provisional application No. 61/950,523, (Continued)

(51) Int. Cl.
*G01V 3/00* (2006.01)
*G01V 3/20* (2006.01)

(52) U.S. Cl.
CPC ..................... *G01V 3/20* (2013.01)

(58) Field of Classification Search
CPC ... G01V 3/28; G01V 3/38; G01V 3/18; G01V 3/20; G01V 3/22; G01V 3/24; G01V 3/26;
(Continued)

(56) References Cited

U.S. PATENT DOCUMENTS 4,502,010 A * 2/1985 Kuckes .................. G01V 3/26
324/247
5,187,440 A 2/1993 Vail, III
(Continued)

FOREIGN PATENT DOCUMENTS

WO WO 2012/100217 7/2012
WO WO 2014/039618 3/2014
WO WO 2015/030993 3/2015

*Primary Examiner* — Thang X Le
(74) *Attorney, Agent, or Firm* — Diederiks & Whitelaw, PLC

(57) ABSTRACT

A first electrode is located at a borehole and a second electrode is located at the surface of the earth. At least one transmitter is selectively connected to one or both of the first and second electrodes to cause current to flow within a subsurface of the earth. When the at least one transmitter is connected to the first electrode, a current is caused to flow at a deep depth within the subsurface and deep source data is acquired. When the at least one transmitter is connected to the second electrode, a current is caused to flow at a shallow depth within the subsurface and shallow source data is acquired. The deep and shallow source data are then combined.

14 Claims, 14 Drawing Sheets

Related U.S. Application Data filed on Mar. 10, 2014, provisional application No. 61/974,744, filed on Apr. 3, 2014, provisional application No. 61/992,454, filed on May 13, 2014.

(58) Field of Classification Search
CPC . G01V 3/30; G01V 3/10; G01V 3/265; G01V 3/02; G01V 3/04; G01V 3/06; G01V 3/104; G01N 27/223; G01N 33/246; G01R 27/18; G01R 27/20; G01R 31/2621; G01R 31/2623; G01R 31/275; G01R 31/2884; G01R 31/318511; G01R 31/2831; G01R 31/318
See application file for complete search history.

(56) References Cited

U.S. PATENT DOCUMENTS

| | | | |
|---|---|---|---|
| 5,877,995 A * | 3/1999 | Thompson | G01V 1/003 367/14 |
| 7,495,446 B2 | 2/2009 | Lovell et al. | |
| 7,746,078 B2 | 6/2010 | Bittar et al. | |
| 8,041,510 B2 | 10/2011 | Dasgupta | |
| 8,392,119 B2 | 3/2013 | Alumbaugh et al. | |
| 8,886,463 B2 * | 11/2014 | Abubakar | G01V 11/00 702/7 |
| 9,069,097 B2 | 6/2015 | Zhang et al. | |
| 9,611,736 B2 * | 4/2017 | Marsala | E21B 49/00 |
| 2003/0025639 A1 * | 2/2003 | Rodney | G01V 11/002 343/719 |
| 2009/0299637 A1 | 12/2009 | Dasgupta | |
| 2014/0239957 A1 * | 8/2014 | Zhang | G01V 3/30 324/334 |

\* cited by examiner

SYSTEM AND METHOD FOR SURVEYING A SUBSURFACE OF THE EARTH

CROSS-REFERENCE TO RELATED APPLICATIONS

The present application represents a National Stage application of PCT/US2014/064916 entitled "System and Method for Surveying a Subsurface of the Earth" filed Nov. 11, 2014, pending, claims the benefit of U.S. Provisional Application No. 61/904,756, filed Nov. 15, 2013; U.S. Provisional Application No. 61/950,523, filed Mar. 10, 2014; U.S. Provisional Application No. 61/974,744, filed Apr. 3, 2014; and U.S. Provisional Application No. 61/992,454, filed May 13, 2014. The entire content of these applications is incorporated herein by reference.

BACKGROUND OF THE INVENTION

The present invention relates to a system and method for probing the subsurface of the earth using electric currents. More particularly, the invention relates to the discrimination of features at depth within the earth from features close to the surface via an electromagnetic source that injects electrical current into the earth via different selectable sets of electrodes, one of which couples to a significant depth.

The embodiments described herein relate generally to soundings within the earth based upon electrical fields. As used herein, "earth" or "Earth" generally refers to any region in which a borehole may be located including, for example, the lithosphere. Electromagnetic (EM) geophysical surveys probe electrical resistivity, or equivalently, conductivity, in the earth as a function of depth. Typical targets of interest include ore bodies, hydrocarbons, water, proppants, hydraulic fracture (or fracking) fluids, salts and other substances injected into the ground, and environmental pollutants. Since the resistivities of such targets and the surrounding medium may be quite dissimilar, the targets may be discriminated by measuring their subsurface resistivities when subjected to an electromagnetic field. Using this methodology, the depth, thickness, and lateral extent of materials of interest may be determined or monitored.

The source of the EM field used in a geophysical survey may originate in the natural environment or be manmade. If manmade, the source may produce a primarily magnetic or electric field that varies in time, and this primary field produces a secondary field in the conducting earth. For example, an electric field produces electric currents in the earth that have an associated magnetic field, and a time varying magnetic field induces electric currents that result in an electric field. The electrical properties of the earth and rate of change of the field determine the relative magnitudes of the secondary and primary fields. The combination of primary and secondary fields results in combined electromagnetic interaction with the earth even for a source arranged to produce solely an electrical or magnetic field.

While the majority of EM geophysical surveys are performed with sensors and EM sources on the surface of the earth, a borehole can provide physical access to the subsurface. Measurement of the electric or magnetic field within a borehole can be related to the electric or magnetic field in the earth around the borehole or the fields that would exist in the earth in the absence of the borehole. Similarly, connecting an electric field or magnetic field source to the earth via a borehole provides a way to produce fields within the earth at desired depths without the attenuation and uncertainties that may result if the source fields originate from a source at the surface of the earth. A particularly beneficial configuration of a borehole EM source is an electrode situated at the top or bottom of a borehole casing, and in electrical contact with that casing, and a group or suite of source electrodes at the surface approximately arranged in a ring centered on the borehole. In this case, significant electric currents in the ground are caused to flow at depth out to a radial distance from the borehole to the surface electrode ring.

The distribution of electric current flow produced by an EM source is determined by the three-dimensional (3-D) resistivity distribution within the earth. The electric field measured at the surface or at depth within a borehole can be used to infer the 3-D resistivity variation over the region where significant current is flowing. The current is typically measured by a suitably calibrated array of electric or magnetic field sensors. The resulting 3-D resistivity variation can be used to project the distribution of ores, hydrocarbons, or water within the measured volume.

A common problem in applying this method of subsurface EM imaging is discriminating spatial changes in resistivity at the depth of the formation from those near to the location of the sensors. Recent models of the current flow from a ring of surface electrodes to a borehole casing show that current flows from the earth into the casing along the entire length of the casing. Thus, significant current flows near the surface of the earth between the source electrodes and the wellhead. This near-surface current causes a significant interfering measurement artifact for measurement configurations wherein receivers are located at the surface of the earth. The problem is that a resistivity anomaly (i.e., a local change in the earth's resistivity) near the surface causes a much larger change in the EM field at the surface than an equivalent resistivity change much deeper in the earth. Surface resistivity anomalies can be static or can vary over time if they are affected by weather events, such as rainfall, and temperature variations, such as freezing. Furthermore, surface anomalies, such as those produced by pipes and other electrically conducting infrastructure, can extend widely over the surface region and be difficult to separate from the signals produced at depth.

Therefore, there exists a need in the art for a system and method to separate, or predominantly separate, a signal of interest produced by a subsurface feature at depth within the earth from a near surface anomaly. Preferably, the method should not attenuate or otherwise reduce the spatial range of the EM survey.

SUMMARY OF THE INVENTION

The present invention relates to separating the effects of variations in subsurface electrical resistivity near the surface from electrical resistivity changes deeper in the subsurface. In one embodiment, a system is provided that includes two or more rings of source electrodes and a method of injecting current into the subsurface at depth via a borehole. One ring of source electrodes is centered on and located relatively far from a borehole, typically with a radius of 1 km or more. The second ring is also centered on the borehole with a smaller radius, typically 100-500 m. A transmitter is configured to alternately cause a current to flow at the surface between one or more electrodes of the outer ring and inner ring, thereby preferentially probing the shallow geology and, subsequently, at depth between the outer ring and the borehole, thereby probing the deep geology. In another embodiment, current is caused to flow between the surface and one or more horizontal wells at depth and between two horizontal wells at depth, thereby providing differential depth resolution. In all cases, a transmitter is configured to alternately cause a current to flow in the shallow and deep modes, or multiple transmitters could be used at once, operating at different frequencies or within different overlapping temporal intervals or by some other means of interleaving the transmissions. The surface EM fields for each transmitter configuration are calculated using a mathematical model of the earth and source electrode system. The data measured in the shallow configuration are multiplied by the ratio of the model results for the deep configuration divided by the model results for the shallow configuration and then subtracted from the data measured in the deep configuration. The resulting data has a reduced contribution from an anomaly at the surface, which increases the relative contribution of the subsurface features compared to the surface features.

Preferably, a subsurface of the earth is surveyed by causing a current to flow at both a deep depth within the subsurface and at a shallow depth within the subsurface. When the current flows at the deep depth, deep source data is acquired, and, when the current flows at the shallow depth, shallow source data is acquired. The deep and shallow source data are then combined. In one embodiment, a first electrode is located at a borehole, a second electrode is located at the surface of the earth, and a third electrode is located at the surface of the earth. At least one transmitter is selectively connected to one or more of the first, second, and third electrodes to cause current to flow within a subsurface of the earth. When the at least one transmitter is connected to the first and third electrodes, a current is caused to flow between the first and third electrodes and deep source data is acquired. When the at least one transmitter is connected to the second and third electrodes, a current is caused to flow between the second and third electrodes and shallow source data is acquired. Preferably, the deep source data and the shallow source data are combined to reduce the effect of the area between the second and third electrodes on the deep source data. Accordingly, the effect of any resistivity anomaly in this area is reduced.

To combine the deep source data and the shallow source data, the shallow source data is subtracted from the deep source data. Additionally, first and second models are calculated, with the first model including the first and third electrodes and the second model including the second and third electrodes. The ratio of the first model to the second model is calculated by dividing the first model by the second model. Formation data is calculated by multiplying the ratio of the first model to the second model with the shallow source data and then subtracting this data from the deep source data.

In one embodiment, the second electrode is located at a first distance from the borehole, the third electrode is located at a second distance from the borehole, and the second distance is greater than the first distance. Preferably, the first electrode is located within 20 m of the borehole, the second electrode is located at least 50 m from the borehole, and the third electrode is located at least 500 m from the borehole. In another embodiment, the second electrode is located on a first side of the borehole, the third electrode is located on a second side of the borehole, and the first side is opposite the second side. In yet another embodiment, an electrode is located at a second borehole and a current is caused to flow between electrodes at the first and second boreholes. In addition, an electromagnetic sensor is located at the surface of the earth.

Additional objects, features and advantages of the present invention will become more readily apparent from the following detail description of preferred embodiments when taken in conjunction with the drawings wherein like reference numerals refer to corresponding parts in the several views.

DETAILED DESCRIPTION OF THE PREFERRED EMBODIMENTS

Figure 1:
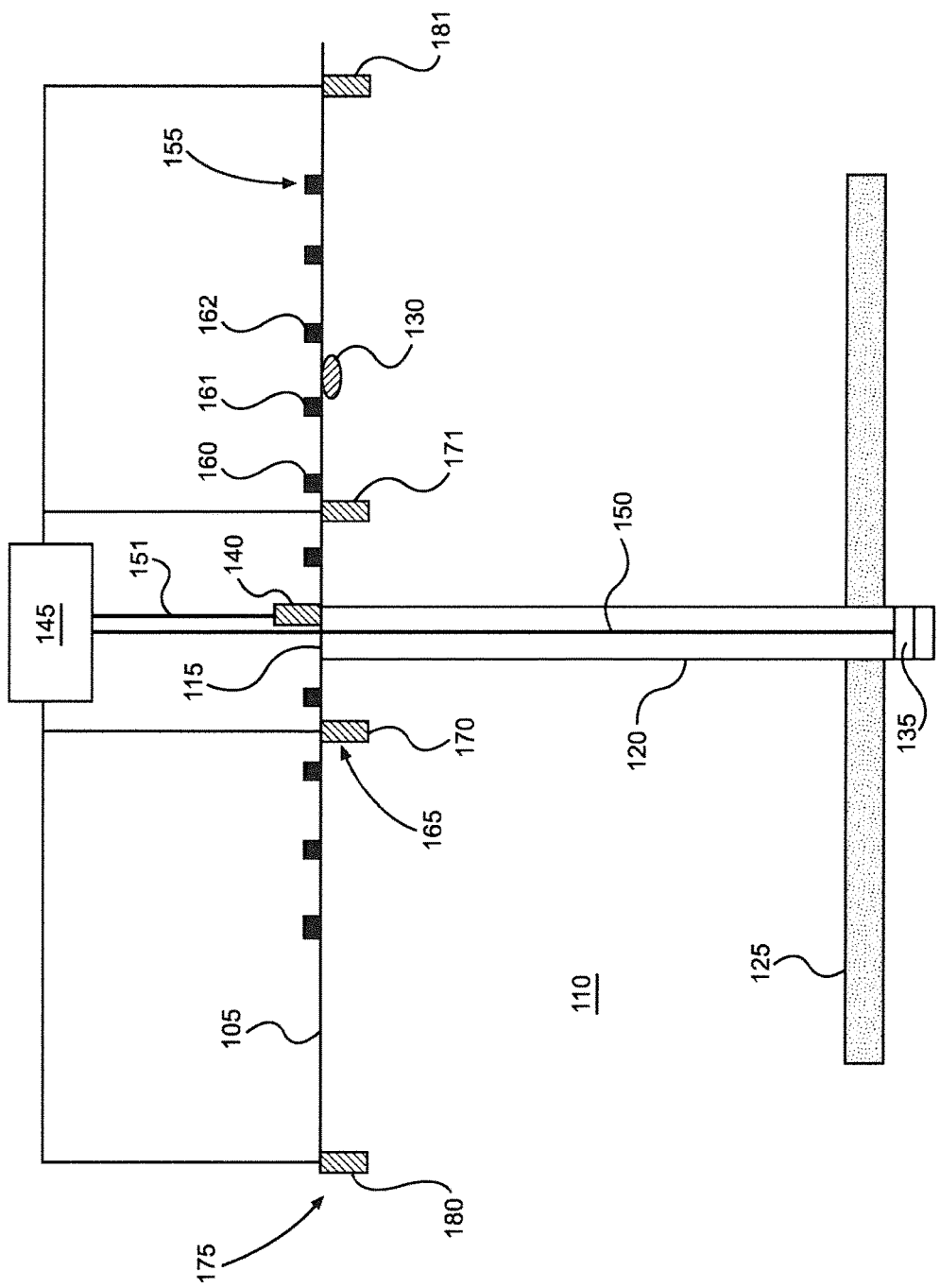
FIG. 1 shows a borehole source with surface counter electrodes adjacent to and offset from the borehole in accordance with the present invention.

Detailed embodiments of the present invention are disclosed herein. However, it is to be understood that the disclosed embodiments are merely exemplary of the invention that may be embodied in various and alternative forms. The figures are not necessarily to scale, and some features may be exaggerated or minimized to show details of particular components. Therefore, specific structural and functional details disclosed herein are not to be interpreted as limiting, but merely as a representative basis for teaching one skilled in the art to variously employ the present invention.

In the description which follows, like parts may be marked throughout the specification and drawing with the same reference numerals. The foregoing description of the figures is provided for a more complete understanding of the drawings. It should be understood, however, that the embodiments are not limited to the precise arrangements and configurations shown. Although the design and use of various embodiments are discussed in detail below, it should be appreciated that the present invention provides many inventive concepts that may be embodied in a wide variety of contexts. The specific aspects and embodiments discussed herein are merely illustrative of ways to make and use the invention and do not limit the scope of the invention. It would be impossible or impractical to include all of the possible embodiments and contexts of the invention in this disclosure. Upon reading this disclosure, many alternative embodiments of the present invention will be apparent to persons of ordinary skill in the art.

As described in more detail below, aspects of the present disclosure provide systems and methods for generating patterns of electric currents within the earth and processing the resulting data to emphasize subsurface features over anomalies at the earth's surface. The system includes one or more electrodes in contact with the surface of the earth and one or more in contact with the earth at depth, via a borehole or some other manner of deep access. In most cases, deep access is implemented via the casing of a well, but any conductor extending to depth, such as an electrical cable with a downhole electrode, a pumping rod, or conducting fluid inside the borehole might be used. The electrodes are alternately connected to a transmitter that causes electric currents to flow in the earth between sets of electrodes that predominantly probe the shallow subsurface and sets of electrodes that predominantly probe the deeper subsurface, in order to discriminate signals produced from shallow and deep subsurface resistivity features.

The invention relates to borehole electromagnetic geophysics, for which the objective is to probe the earth at significant depth for targets of interest. Because of their widespread availability, particularly at known deposits of hydrocarbons, a borehole is typically used to facilitate access to the deeper subsurface. However, in contrast to other EM methods applied to boreholes, the invention is applied to regions a considerable distance from a borehole, greater than 50 m and often greater than 1000 m. In the following description, a borehole will be depicted as the part of the system providing access to the target depth. However, it should be understood that such access could be provided by a natural feature, such as a cave or fissure; manmade access, such as a mine, tunnel, or sewer; or via a conductor already present, such as a pipeline or buried power cable.

The invention reduces the contribution of the shallow surface signal from a measurement of the subsurface. Electromagnetic methods do not propagate into the earth to a precisely defined depth, but rather decrease with distance away from the source probe in a continuous, monotonic manner. Thus, the definition of shallow and deep as it applies to the invention is relative. For example, for a hydrocarbon reservoir at a known depth, the system operating in deep mode would be required to produce at the surface a measurable field related to the reservoir, while in shallow mode it would produce a signal related to the reservoir on the order of 10% or less of the signal in deep mode. The source electrodes for the deep and shallow modes would be arranged to produce such a ratio in the measured signals. The sensors remain in the same location, or within approximately 50 m of the same location, during recording in deep and shallow modes so that the same region of the near surface is interrogated in both modes.

The invention enables the generation of fields that are measured by remote sensors. For ease of use, the invention will generally be used in conjunction with an array of sensors deployed at the earth's surface. A defining feature is that the sensors are outside the borehole, or other means of deep access, and are separated from that region by a distance which in practical cases is at least 50 m. For example, in the case of a borehole, the sensors would be at least 50 m from the wellhead. In contrast, in the method of borehole logging, or simply "logging", the source and receivers are lowered or otherwise emplaced in the same borehole, usually integrated together in a self-contained housing.

For the purpose of this invention, the deep mode corresponds to a depth of greater than 150 m and, more typically, to a depth of greater than 1000 m. The separation between electrodes that generates the shallow mode signal should generally be less than the depth of the deep mode, depending on the resistivity of the underlying geology. As discussed, the zone of the survey sensitivity will typically extend laterally more than 1000 m from the borehole. To cover the surface region of interest, one set of electrodes is typically deployed at the surface within 100 m of the borehole and another set substantially further away, at a distance of approximately the depth of the deep mode survey. In other words, the distance from the borehole to the other set of electrodes is substantially larger (i.e., at least two times larger) than the distance from the borehole to the first set of electrodes.

FIG. 1 is a cross section schematic showing a surface 105, a subsurface 110, a borehole 115 with a casing 120, a formation 125 and a near surface electrical resistivity anomaly 130, according to one embodiment of the present invention. Borehole 115 is formed in the earth in material that includes rock, sand, sandstone, soil, salts, or volcanic or other material. In particular, a preferable material is one that is typically capable of containing a valuable resource, such as hydrocarbons. Electric current can be induced to flow in the earth at depth via an electrode 135 deployed in borehole 115. The invention can be used with boreholes that have some or all sections of their casing made from electrically insulating materials or that are without casing. The latter form may be particularly beneficial when a slim well is drilled close to a formation specifically for use with the invention and there is no need to case it for production. In the event only part, or none, of the casing is an electrical conductor, then using a downhole electrode, such as electrode 135, is preferable and the downhole electrode should be deployed so that it contacts the earth at approximately the depth of the subsurface feature of interest. For a conducting casing, electrical contact to the casing can be made to any conductor that is itself in electrical contact with the casing, such as a collar, wellhead, or production tubing within the casing. In such a case, electric current can flow in the earth at depth to casing 120, for example, and then up casing 120 to an electrode 140.

Electrodes 135 and 140 are electrically connected to a transmitter 145 via cables 150 and 151, respectively. For convenience, transmitter 145 can be located at surface 105, though this is not essential. Electrode 135, cable 150, and transmitter 145, if so deployed, may be inserted into borehole 115 in any known manner, including wireline, work string, or coiled tubing. In the case of a borehole that is under pressure, the assembly may be inserted via a lubricator in order to maintain the well's pressure. Although not shown in FIG. 1, it is within the scope of the invention for multiple casings to be connected to transmitter 145 at the same time. Having multiple connections at once has the benefit of increasing the amount of survey data that can be acquired over a given period of time. Similarly, although only one transmitter 145 is shown connected, it is within the scope of the invention that more than one transmitter be connected at once. If multiple transmitters are connected, the transmitters can be operated at the same time or serially. If operated at the same time, the transmitters can be set to produce electric current waveforms of different frequency. Electrodes 135 and 140 pass electrical current from transmitter 145 into the earth. Typically, the electrical contact is galvanic, in that a DC electrical voltage causes a DC electrical current to flow. The contact can also be capacitive so that an AC voltage is required to induce an AC current. For purposes of clarification, the term electrode, as used herein, does not apply to magnetic sources that induce a current in the earth by means of an oscillating magnetic field.

Referring back to FIG. 1, electrical resistivity anomaly 130 is shown schematically near surface 105. Anomaly 130 could be a reduction in the local electrical resistivity caused, for example, by a metallic object, such as a pipe buried in the ground, or a collection of water. Alternatively, anomaly 130 could be an increase in the local resistivity that could be caused by a mass of less conductive earth, such as large rock or sand or a region of lower compaction. Further, anomaly 130 could be due to sudden changes in surface topology, such as a pit or dry channel in the surface terrain. Electromagnetic sensors 155 are disposed either just above or just below surface 105 following the standard installation methods known to those skilled in the art. One or more of sensors 155 (e.g., a sensor 161 and, to a lesser extent, sensors 160 and 162) may be located close enough to anomaly 130 that their respective output signal is significantly distorted by the effect of anomaly 130 in the subsurface current. Generally, anomalies are of small physical size compared to the formations of interest and the scale of the survey. As a result, for an anomaly to have a measurable effect on one or more sensors 155, the anomaly must be located close to the surface. The problem to be addressed is that when the magnitude and location of subsurface anomalies are not known, the subsurface anomalies cannot be accounted for in the analysis of the data collected from sensors 155. Thus, if anomaly 130 produces a change in the output of sensor 161, this change cannot be distinguished from a signal due to a feature of interest in formation 125.

FIG. 1 also shows an inner ring 165 of electrodes, which includes electrodes 170 and 171, and an outer ring 175 of electrodes, which includes electrodes 180 and 181. As indicated in FIG. 1, the distance, or offset, of electrodes 170 and 171 from borehole 115 is small. This is done to minimize the surface area around borehole 115 that is not covered by the survey. The offset of electrodes 180 and 181 defines the area of the earth being surveyed, as described in PCT Application No. PCT/US2013/058158, which is hereby incorporated by reference.

Figure 2:
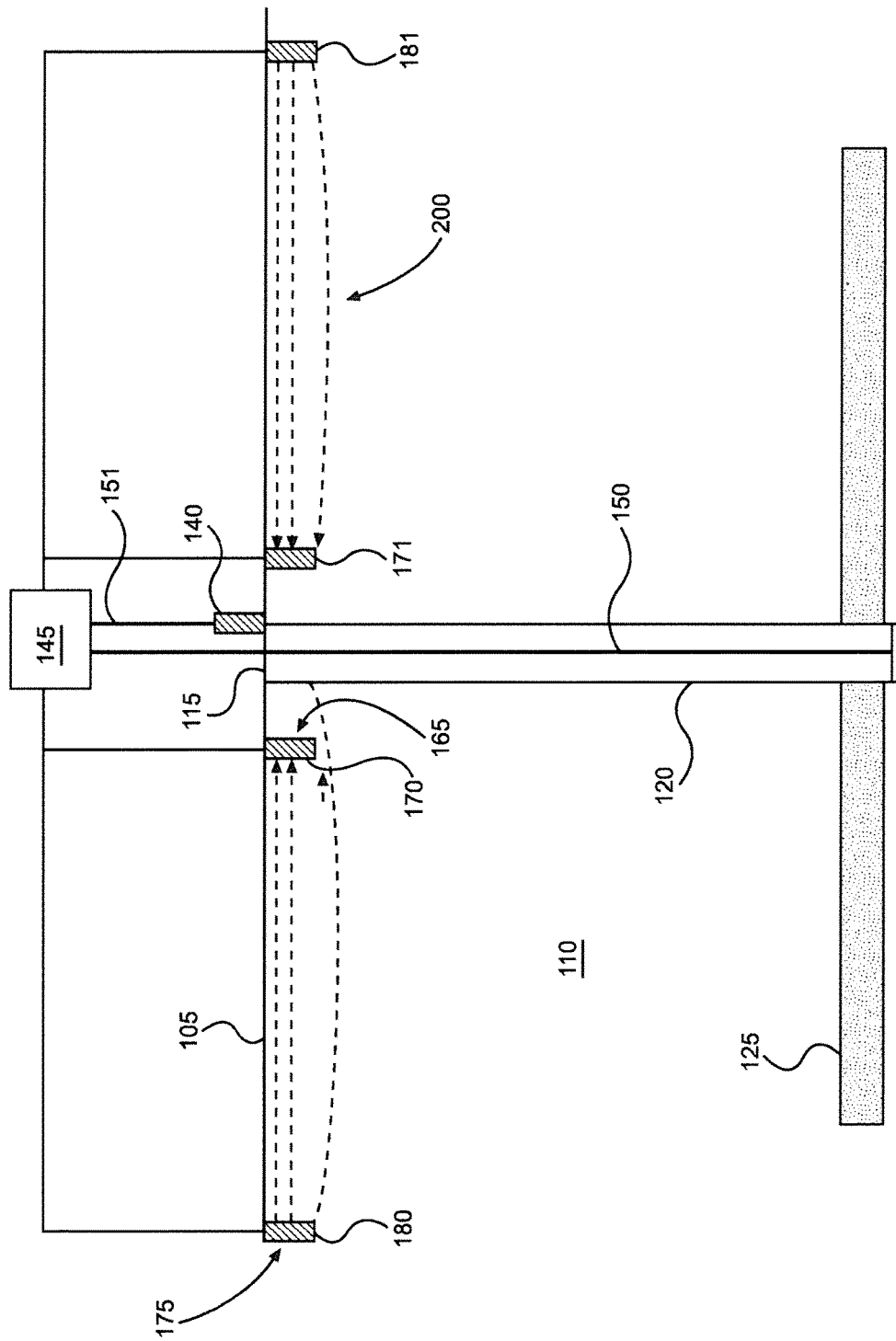
FIG. 2 illustrates the current paths when electrodes of inner and outer rings are driven by a transmitter so that a current flows from the outer ring to the inner ring.

FIG. 2 shows the path of the currents within subsurface 110 when transmitter 145 is connected across the electrodes in rings 165 and 170. The resulting current flow between inner and outer rings 165 and 170 is indicated by lines 200. In this arrangement the current flow is predominantly parallel to, and in the vicinity of surface 105. It should be understood that, although current flow 200 is indicated to be towards borehole 115, current flow 200 can be in the opposite direction and, preferably, an oscillating (i.e., AC) current waveform is used for which the current flow is partly in one direction and partly reversed to flow in the opposite direction. For simplicity, sensors 155 and anomaly 130 are not included in FIG. 2 (or subsequent figures).

Figure 3:
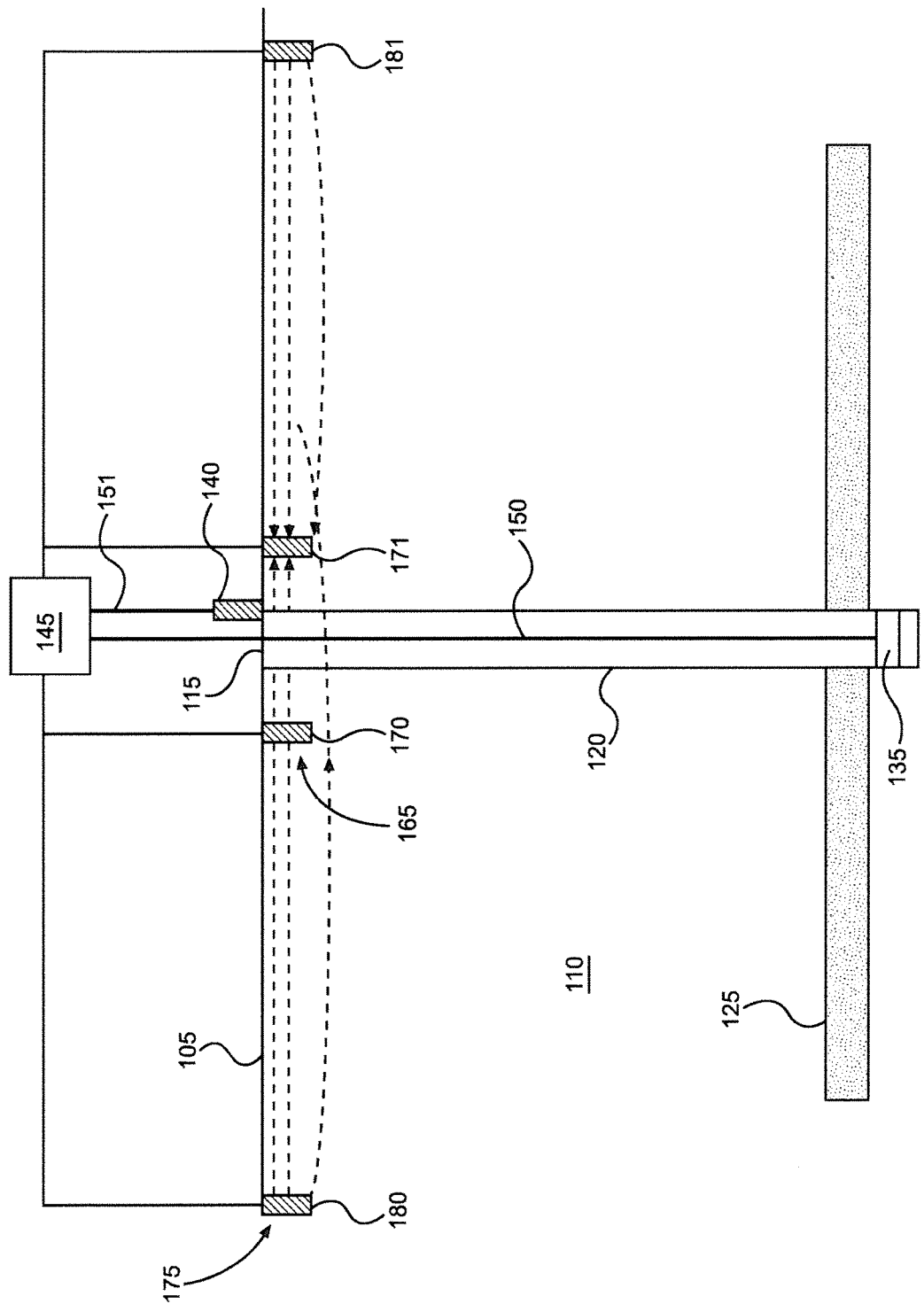
FIG. 3 illustrates the current paths when electrodes in the inner and outer rings are driven by the transmitter so that a current flows from the outer ring to the inner ring and one or more electrodes of the inner ring are not connected so that current flows across the region where a casing is located.

FIG. 3 shows an equivalent configuration to that shown in FIG. 2, with the modification that, in FIG. 3, current flows across the region defined by inner ring 165 of electrodes. This is effected by disconnecting one or more inner ring electrodes, such as electrode 170, so that the current flows across the region where the well is located to one or more connected electrodes, such as electrode 171, of inner ring 165. This configuration has the advantage that subsurface anomalies within inner ring 165 can also be preferentially detected compared to deeper subsurface features. It also has the advantage that the distance of the inner electrodes (i.e., electrodes 170 and 171) from the well can be increased without leaving a larger region around the well that is not probed by the surface current.

Figure 4:
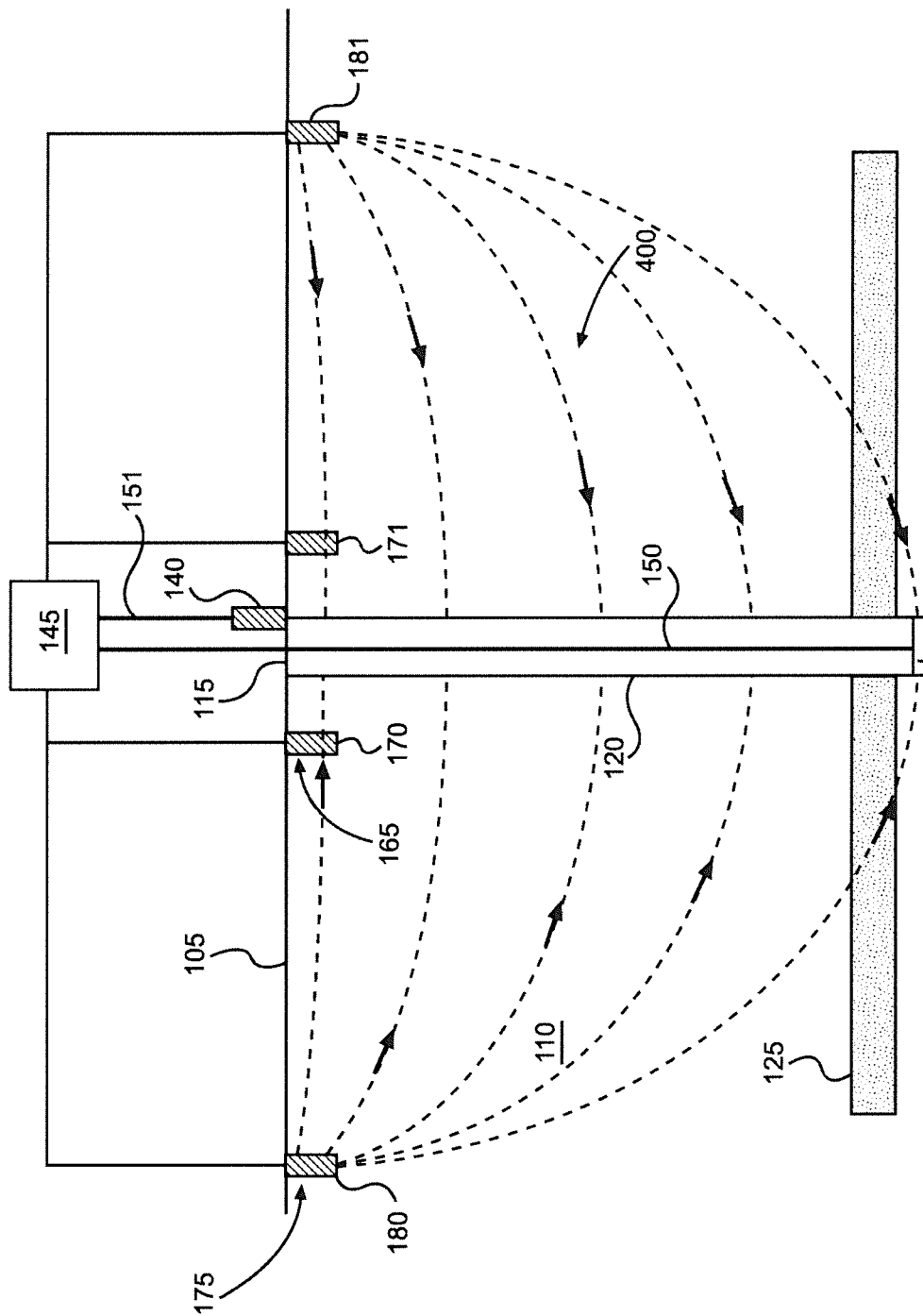
FIG. 4 illustrates the current paths when electrodes at the bottom or top of the casing are driven by the transmitter relative to the electrodes in the outer ring when a well is cased with an electrical conductor.

FIG. 4 shows the path of the currents within subsurface 110 when transmitter 145 is connected across electrodes 135 and/or 140 and one of the outer ring electrodes 180 and 181. The resulting current flow is indicated by lines 400. In FIG. 4, the well is cased with an electrical conductor. As a result, currents flow from electrodes 180 and 181 to casing 120, then along casing 120 to one or both of electrodes 135 and 140, and then via electrodes 135 and 140 back to transmitter 145. Because of the extension of casing 120 into the earth, there is significant current flow at the depth of formation 125. Typically, the current flow at formation depth for the deep mode source electrode configuration shown in FIG. 4 is at least ten times greater than for the surface mode configurations shown in FIGS. 2 and 3. However, the magnitude of the current flow near to surface 105 for the deep mode source electrode configuration shown in FIG. 4 is similar to that flowing near surface 105 for the source electrode configuration of FIGS. 2 and 3.

The operation of the invention is illustrated by consideration of FIGS. 2, 3 and 4. By application of transmitter 145 across one or more electrodes that are at formation depth (e.g., electrode 135) or in contact with a casing that extends to formation depth (e.g., electrode 140), as in FIG. 4, the formation is preferentially illuminated and probed by the subsurface current. By application of transmitter 145 across electrodes at surface 105 (e.g., electrodes 170, 171, 180 and 181), as in FIGS. 2 and 3, resistivity anomalies near to the electrodes are illuminated, but formation 120 at depth has little illumination. Thus, by subtracting the receiver signal for a shallow source configuration (i.e., FIGS. 2 and 3) from the receiver signal for a deep source configuration (i.e., FIG. 4), the signal due to near surface anomalies can be reduced while preserving the signal from the much deeper formation.

Figure 5:
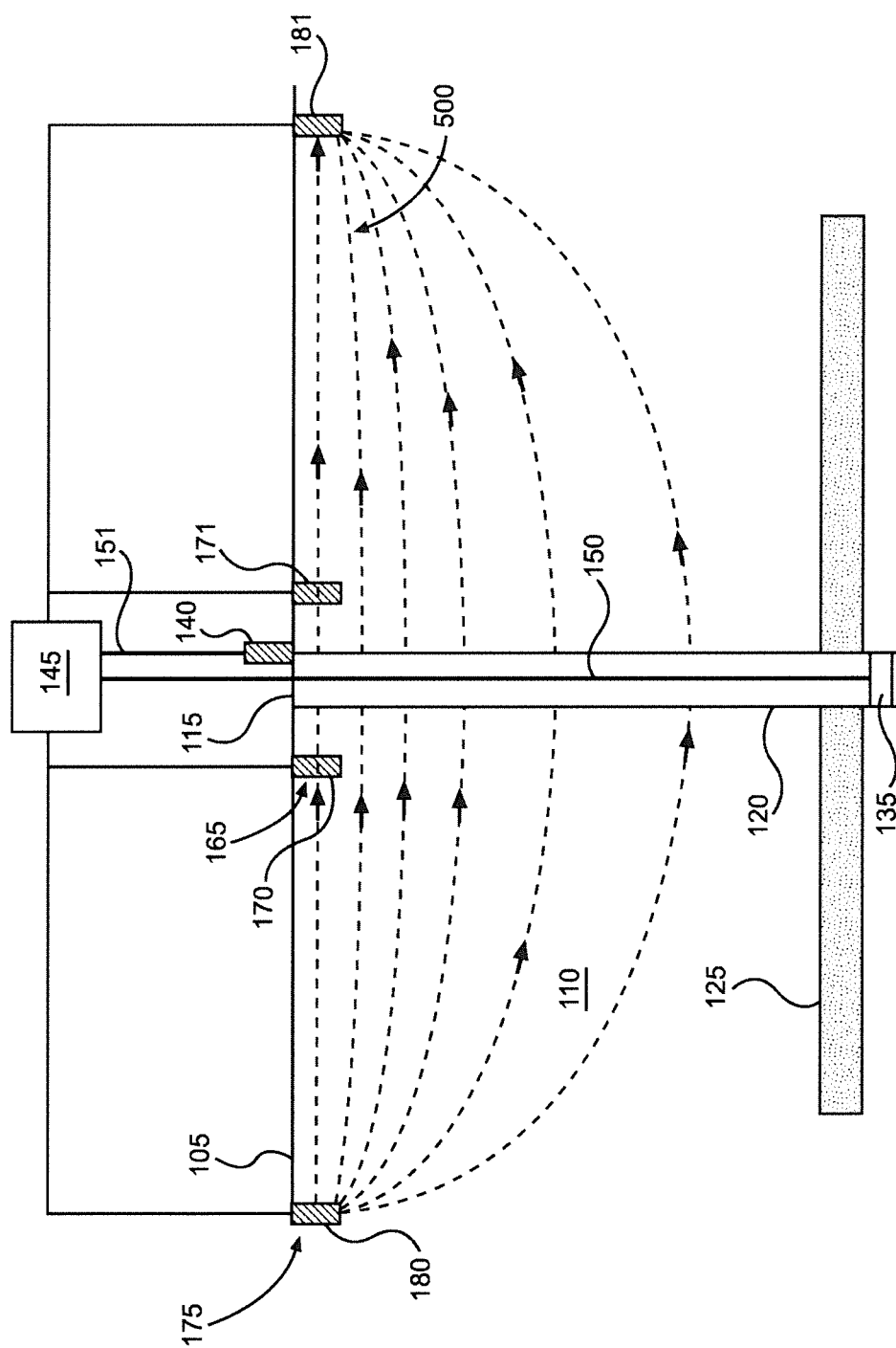
FIG. 5 illustrates the current paths when the electrodes in the outer ring, on approximately opposite sides of the borehole, are driven at opposite polarity and the electrodes in the inner ring and at the casing are not connected to the transmitter.

It is not necessary that a complete ring of electrodes be used for either inner ring 165 or outer ring 175. In the case where electrodes 180 and 181 are deployed on mostly opposite sides of the well, for example, the angle between them subtended at the well is greater than 120 degrees. As a result, a further current injection path can be implemented to preferentially illuminate the surface anomalies over the deep features, as illustrated in FIG. 5. Here, one or more electrodes of outer ring 175 on opposite sides of borehole 115 are driven at opposite polarity and the electrodes of inner ring 165 are not connected to transmitter 145. Current flows from one side of outer ring 175 across the well to the opposite side of outer ring 175. Example subsurface current paths 500 are shown. This surface cross-well source configuration can be used as a substitute for the annular surface source (FIG. 2) or be used in conjunction with it.

Depending on how a well is completed, a downhole electrode can be located on the outside of the well casing, be a conductor inside a casing that makes electrical contact to the inside of the casing, or be deployed in an open (i.e., uncased) well. The electrode can make electrical contact with the host rock or casing via a direct mechanical contact or via conduction through fluid inside the well where the electrode is located. Electrodes at the surface can be deployed in any known manner. A preferable way to deploy a current injection electrode downhole, inside a cased or uncased well, is to lower the electrode via a cable or wireline. A particularly convenient method is to adapt a perforation gun to be a downhole electrode. Methods to position a perforation gun within a vertical or horizontal well are well known to those skilled in the art. The gun can be modified so that the electrical cable used to trigger the explosives is attached to the body of the gun, so that electrical current flows down the cable to the outer surfaces of the gun and from there into the fluid within the well. If necessary, a conducting salt, such as potassium chloride, can be added to the well fluid to increase the electrical conductivity between the downhole electrode and the casing or host rock.

The boreholes depicted in this application are shown to have an approximately equal depth into the earth and to project an approximately equal distance below the reservoir layer. However, it is not essential that the boreholes extend to the same depth or reach or penetrate a target layer equally. Indeed, illuminating the subsurface at different depths has the benefit of offering increased vertical differentiation of one or more target layers. In the illustrations herein, the borehole is sometimes depicted as being in a straight, entirely vertical orientation. However, the borehole, and any casing placed therein, can deviate from vertical and even have lateral sections that are horizontal. Current can be injected from a lateral section of a horizontal well and wells of different lateral length have the potential to illuminate a deep feature from opposite sides, thereby improving the resulting EM image. When the location of the borehole is specified herein, the reference is to the top of the borehole where it meets the surface of the earth. In the case where the well deviates from a vertical orientation, surface electrodes need not be deployed approximately symmetrically around the top of the borehole (as shown in FIG. 1, for example), but may be distributed over the horizontal section of interest, as described in PCT Application No. PCT/US2013/058158, which is hereby incorporated by reference.

In its basic form, the invention involves a single deep mode measurement and a single shallow mode measurement at a given sensor location. However, it is within the scope of the invention to perform multiple deep and shallow mode measurements for the same sensor location, or for sensors that cover substantially the same location (e.g., sensors with the same approximate center location but that are rotated to optimize their sensitivity for different source locations). A scenario of considerable practical relevance is a mature hydrocarbon field that has been drilled in a number of locations, possibly to different depths, and thus has two or more existing wells. Further, one or more additional wells could be drilled to enhance production (for example, water drive or $CO_2$ enhanced oil recovery), and these wells could be utilized in the invention. Still further, all the wells could be drilled for new production, as in the new production method of hydrofracturing unconventional reservoirs, for example. In particular, this aspect of the invention described herein relates to boreholes that have significant horizontal, or lateral, sections.

Figure 6:
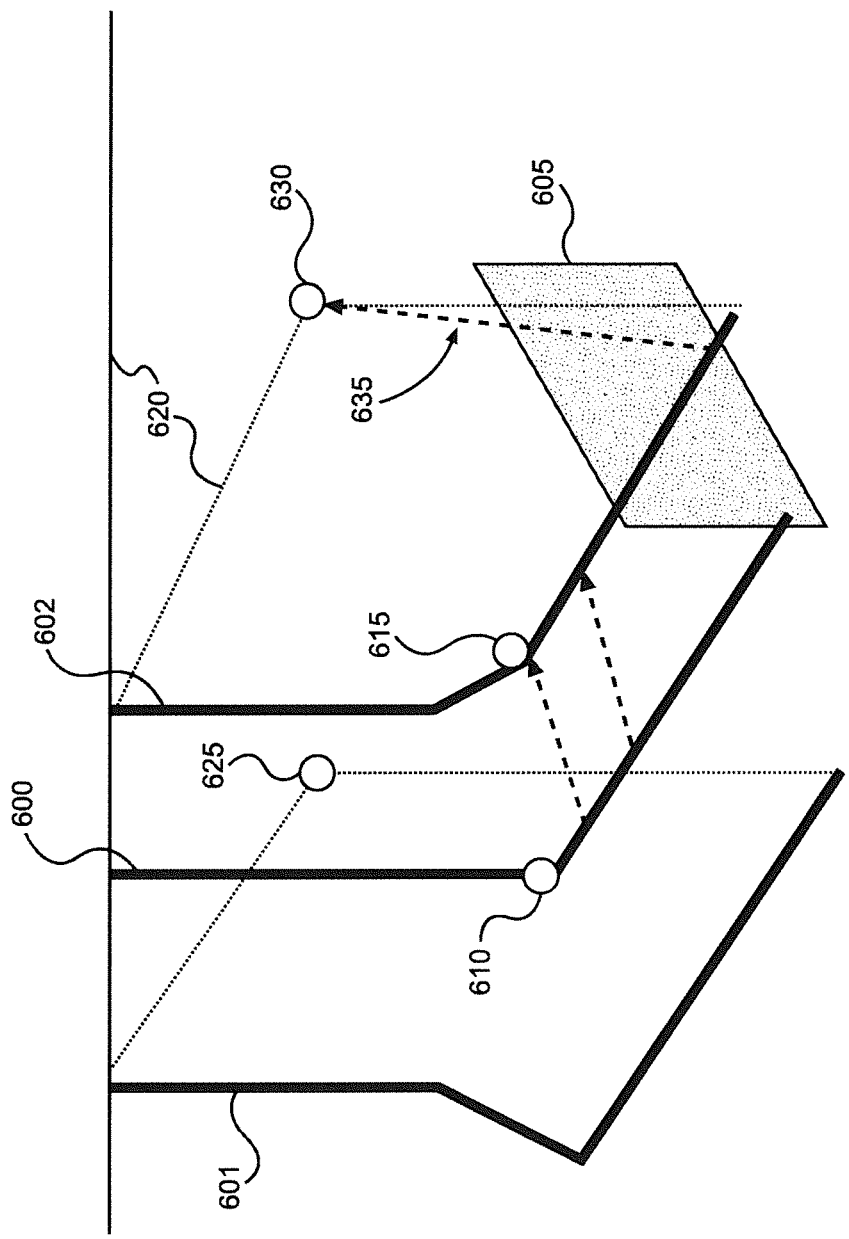
FIG. 6 is a perspective view of three cased wells with horizontal sections and shows the location of downhole electrodes at heels of two wells, two current injection electrodes at the surface and a perpendicular fracture intersecting near an end of one casing.

An example of the invention applied to an advanced multi-well completion with horizontal well sections is shown in FIG. 6. Three wells 600, 601 and 602 are shown in FIG. 6, and related figures, for purposes of illustration only, and any number of wells are included within the scope of the invention. The wells depicted in FIG. 6 represent a common situation of multiple wells drilled into the same formation for the production of hydrocarbons or a similar asset. Because these wells are drilled for production, it is advantageous to take advantage of them in practicing the invention, but this is not a requirement, and one or more new boreholes could be drilled to implement the invention. FIG. 6 shows a view of a first well 600 flanked by wells 601 and 602. Each well has a single lateral section, and the lateral section of well 602 intercepts a fracture 605 in a perpendicular plane. To implement a deep mode measurement, a current injection electrode can be located near to a heel of any of the wells (i.e., near the intersection of the vertical and lateral sections). For example, FIG. 6 shows electrodes 610 and 615 at the heels of wells 600 and 602, respectively. To complete the transmitter circuit for deep mode operation, one option is a current injection electrode located on a surface 620 of the earth. In FIG. 6, two such electrodes are shown (i.e., electrodes 625 and 630), which are deployed approximately above the toes (or ends) of the lateral sections of wells 601 and 602, respectively.

Figure 7:
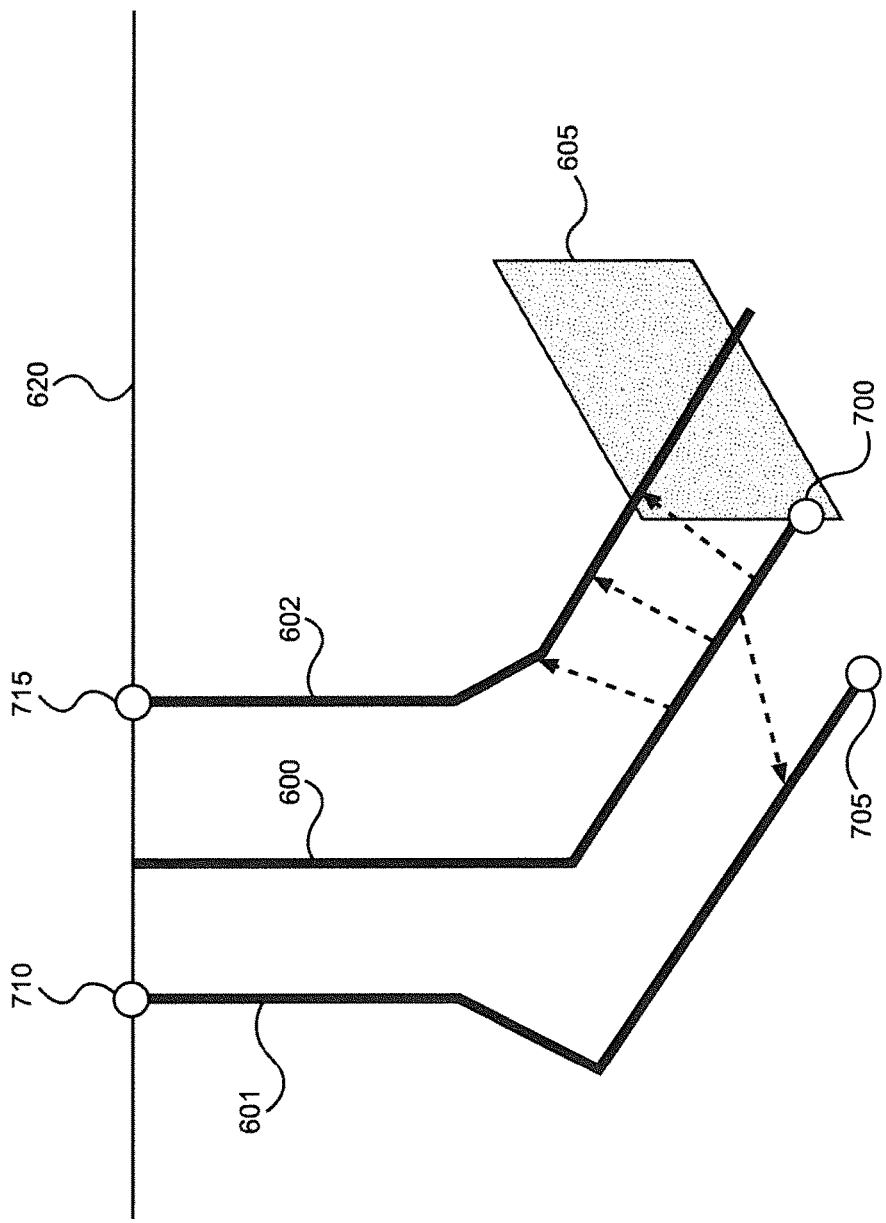
FIG. 7 is a perspective view of three cased wells with horizontal sections and shows the location of a downhole electrode at a toe of one well and two current injection electrodes connected at a top of the other casings at the surface.

FIG. 7 depicts the same three wells as in FIG. 6 (i.e., wells 600, 601 and 602), but with downhole current injection electrode 700 and 705 at the toes of wells 600 and 601 and surface current injection electrode 710 and 715 adjacent to the tops of wells 601 and 602. Although electrodes 700 and 705 are shown at the ends of the boreholes and, for convenience, referred to as toe electrodes, electrodes 700 and 705 can be located anywhere along the lateral sections. For example, during the procedure of hydraulic fracturing, a cased borehole is completed in stages working back from the toe and plugged along the lateral section after each stage is perforated. In such a scenario, a toe electrode could be moved back along the borehole as required.

In the figures, dashed arrows are used to illustrate some of the paths of the subsurface current. For example, in FIG. 6, arrows 635 indicate some of the current paths when a transmitter (not shown) is connected across downhole electrode 610 and surface electrode 630. Such paths will occur if the borehole has a conducting casing, thereby causing the current to be preferentially emitted from and collected by the high conductivity of the casing. Similar paths of different current amplitude will occur if the borehole is not cased but filled with a conducting fluid, such as brine. There are many other current paths in the subsurface, including paths that extend below the bottommost point of a borehole and outside the outer area defined by a surface electrode. However, the current in these more extreme paths is less than that in the major regions that are highlighted by the dashed arrows in each figure.

Each of the individual injection electrode locations depicted in FIGS. 6 and 7 can be used in multiple ways. For example, in connection with FIG. 6, a transmitter can be connected across electrodes 610 and 615; electrodes 610 and 625; electrodes 610 and 630; electrodes 615 and 625; or electrodes 615 and 630. The transmitter can also be connected across electrode 610, or electrode 615, and both electrodes 625 and 630 in parallel. Similarly, electrode 625, or electrode 630, can be used with electrodes 610 and 615 in parallel. In FIG. 6, borehole 601 has been shown without a downhole electrode. This is for illustrative purposes only in order to show that a first borehole, and the region around it, can be illuminated from a second borehole without any access to the first borehole. This ability to use the invention without accessing a well at all is of particular benefit when an EM survey is to be conducted during a hydrofracturing operation, for example, on borehole 601. FIG. 7 shows other locations for a current injection electrode. As with the electrodes of FIG. 6, there are multiple ways the electrodes in FIG. 7 can be connected to a transmitter (not shown). For example, the transmitter can be connected across toe electrode 700 and one or both top electrodes 710 and 715. Similarly, toe electrodes 700 and 705 can be used in conjunction.

Regarding FIGS. 6 and 7 and, more generally, wells with significant lateral sections, the electrode configuration for the shallow mode measurement can be implemented in a manner similar to that of the vertical wells depicted in FIGS. 1-5. As a result, a shallow mode current can be produced that does not appreciably probe the deep mode geology and so does not produce a significant signal at the surface from the deep mode geology. For example, with respect to FIG. 6, inner surface mode electrodes can be deployed near to the top of one or more of wells 600, 601 and 602 (as with electrodes 170 and 171 in FIGS. 1-5) for use with one or more outer surface electrodes (i.e., electrodes 625 and 630). Similarly, with respect to FIG. 7, outer surface mode electrodes can be deployed to locations similar to those for electrodes 625 and 630 of FIG. 6 for use with inner surface mode electrodes (i.e., electrodes 710 and 715).

The separation between the boreholes and injection electrodes should be such that a sufficient subsurface current flow can be established between them for a measurable signal change to be produced for the subsurface target of interest. In practice, the electrical resistance between two points within the earth does not increase strongly with the distance between them and, further, the effect of increasing the separation can be compensated for by using a transmitter that can output a higher voltage. In most practical situations where arrays of wells are used for injection and production, the wells are easily close enough to be used as part of the invention. In general, the condition that wells are arranged close enough together to be used as part of the invention is termed that the wells are in range of each other. For commercially available transmitters and state-of-the-art EM sensors, the electrodes and boreholes should be within 5 km of each other, and, more preferably, within 2 km.

A particular application of the invention when used with multiple lateral wells is to improve the measurement of fractures caused by the commercial procedure of hydraulic fracturing. Pressure transferred by a fluid is used to create fractures within the subsurface outside the borehole. The pressurizing fluid then flows into those fractures. In this case, the fluid used to create the fracture should be sufficiently electrically conducting to disrupt the path of subsurface electric current in order to produce a measurable signal. One fluid that can be used is water with a high salt concentration. Alternatively, the fluid can contain particles that have measurable electrical properties. Although the method is referred to as fracturing, it is not required that a single fracture be produced or that the fracture region be a thin, narrow separation of the subsurface. Indeed, those skilled in the art consider that, in many instances, a region of damage comprising many intersecting cracks is produced. For the purposes of this invention, a fracture is defined to be any region of subsurface disturbance with at least one very short dimension, either present due to natural process or as a result of a fracturing procedure.

Figure 8:
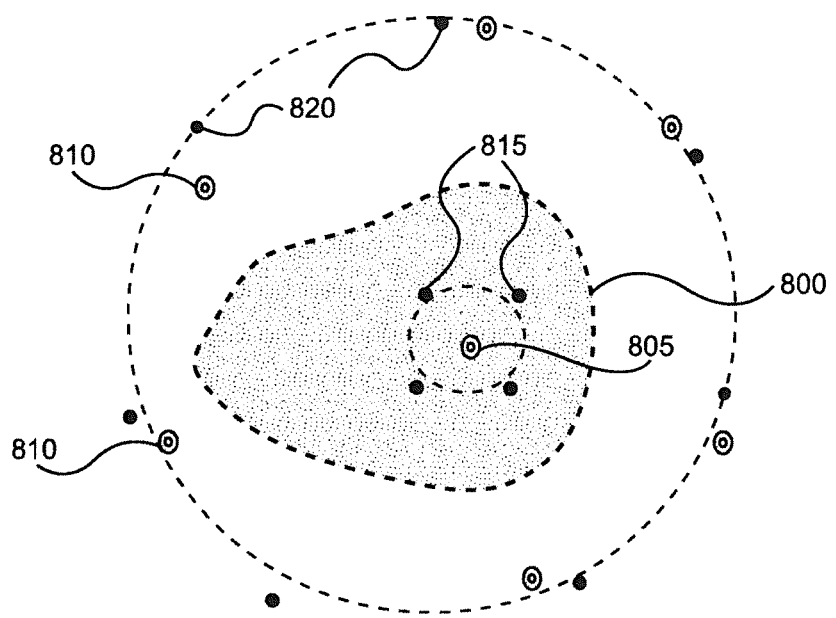
FIG. 8 is a plan view of multiple cased wells with a fluid volume between them, an inner ring of source electrodes installed around a central well and a separate outer ring of source electrodes at proximate a suite of outer wells.
Figure 9:
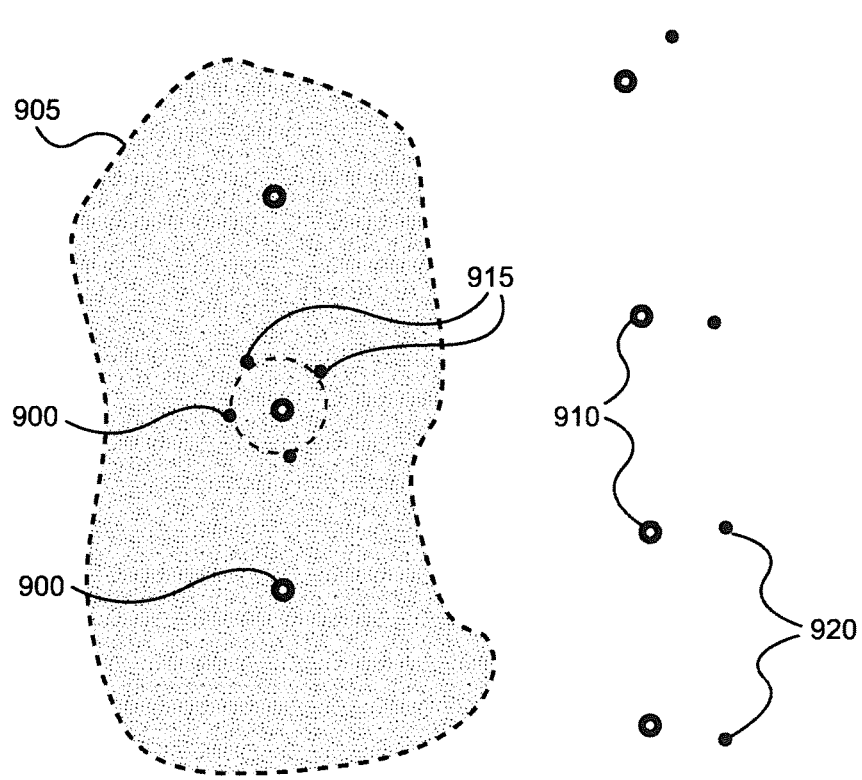
FIG. 9 is a plan view of a line drive, including one or more first wells arranged along a line, and a line of secondary wells, with surface electrodes located at one of the first wells and near the line of secondary wells.

Turning to FIG. 8, there is shown a group of several wells deployed to enhance the production of a volume of fluid 800. A typical pattern involves a central well 805 surrounded by one or more outer wells 810, as illustrated in FIG. 8. A similar, alternative configuration is a line-drive in which one or more injector wells 900 drive a fluid 905 (such as hydrocarbons) towards a line of one or more producing wells 910, as illustrated in FIG. 9. More generally, there is typically at least one well into which a fluid is injected and one or more wells out of which hydrocarbons are produced. In such a configuration, there is an economic benefit and possibly other needs to image the volume of injected fluid, the volume of displaced fluid or multiple fluids. For the purpose of describing the invention, a scenario is identified in which there is a first well that penetrates a subsurface region, such as a reservoir, in which a fluid is located. This fluid can be produced at the well (e.g., oil, gas, or potable water) or be a fluid injected into the well (e.g., water or $CO_2$) to support the production of hydrocarbons at another location. In general, the host reservoir will contain fluid or gas, and the fluid depicted at the first well in the illustrations included herein is intended to highlight a specific body of fluid that is injected or desired to be produced. However, is not essential that a fluid be present, and the invention can be applied to image any resistivity anomaly, including a shale bed or ore deposit, or to determine the resistivity of the host rock.

FIG. 8 shows a plan view of central well 805 intercepting fluid 800 and surrounded by a ring of outer wells 810 in an approximately circular configuration centered on the central well 805. There is a suite of inner electrodes 815 located at the surface and all positioned at approximately equal radial distance from central well 805 and approximately equally spaced from one another. There is also an outer suite of electrodes 820 at the surface, also all positioned at approximately equal radial distance from central well 805 but at a radial distance approximately equal to that of the ring of outer wells 810. In a practical embodiment, central well 805 can be an injection well, outer wells 810 can be producing wells, and the fluid that is injected causes increased output of hydrocarbons at the producing wells. FIG. 9 shows an embodiment in which one or more injector wells 900 are arranged approximately in a line that is approximately parallel to a line of producing wells 910. For ease of comparison to FIG. 8, a single injector well 900 has been highlighted with a suite of inner surface electrodes 915 placed around it, in a similar manner to central well 805 depicted in FIG. 8. Similarly, a suite of surface electrodes 920 is located near to producing wells 910, in an equivalent manner to the central configuration shown in FIG. 8. Although, in FIGS. 8 and 9, suites of surface electrodes have been depicted and discussed as being near to first and secondary wells, a suite can be a single electrode, and it is not essential that each secondary well be paired with an individual surface electrode, as will become apparent below.

Figure 10:
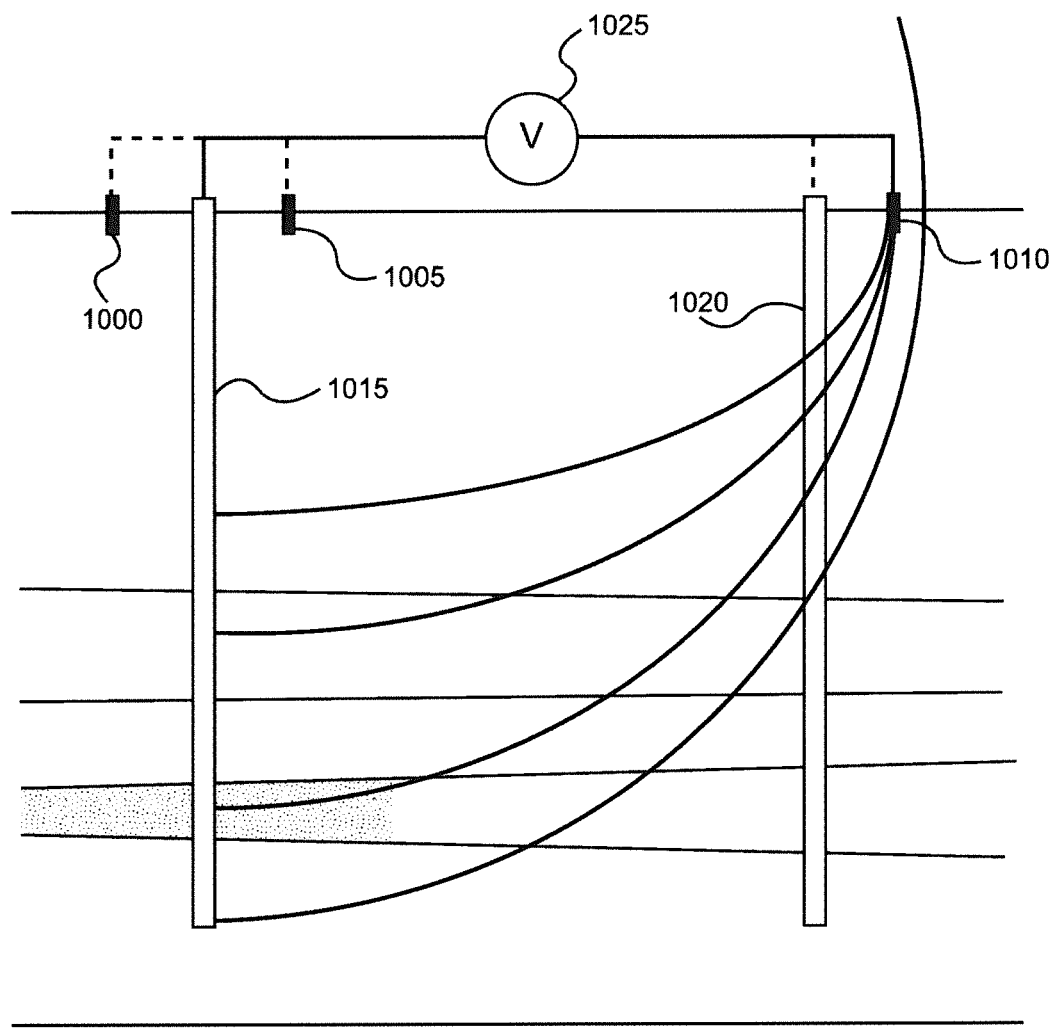
FIG. 10 illustrates the current paths when a voltage is applied across a casing and a surface electrode at a significant lateral offset from the casing, with the surface electrode in the vicinity of a second casing and the second casing not connected to the transmitter and so not forming part of the source circuit.
Figure 11:
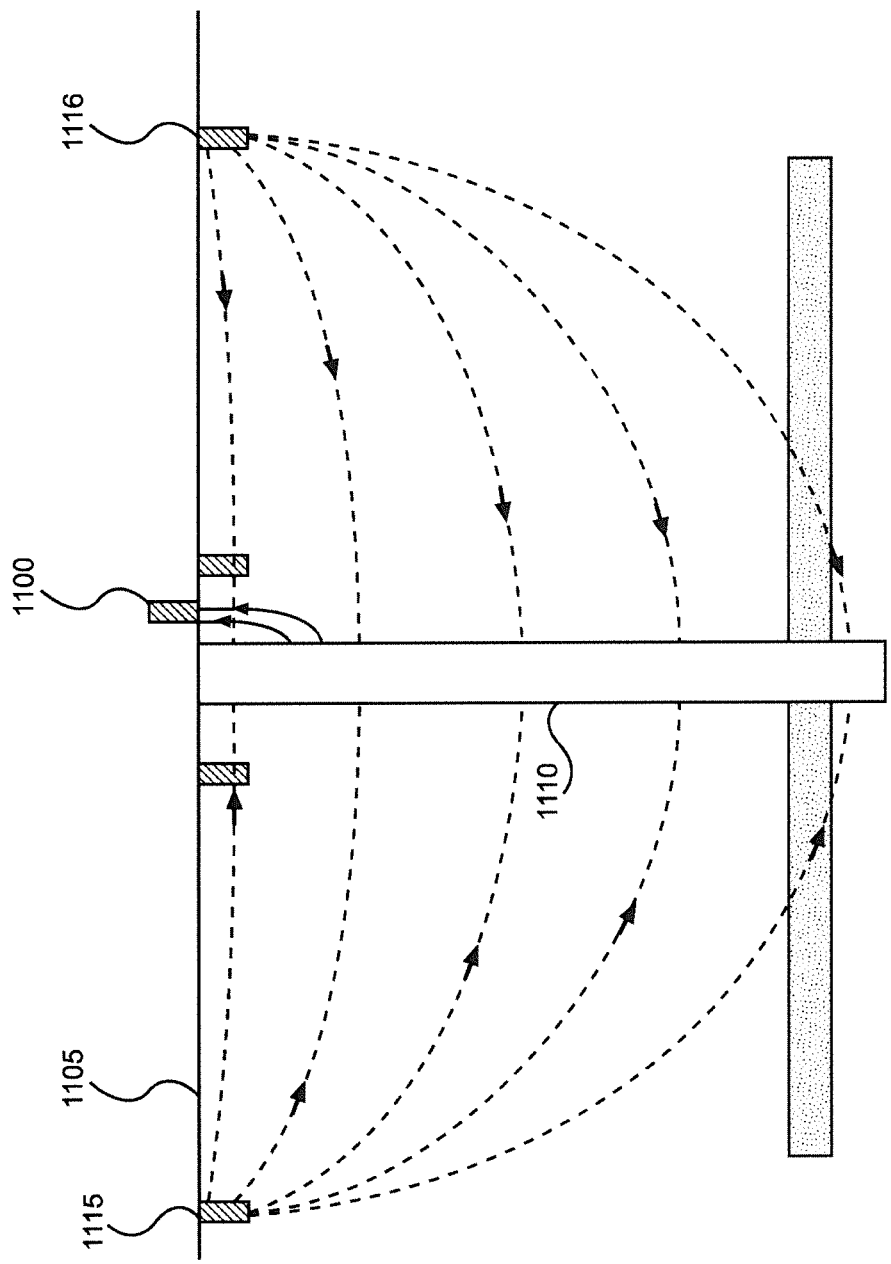
FIG. 11 illustrates the current paths when electrodes in the outer ring are energized and when another electrode is located close to, but not in direct contact with the casing.

FIG. 10 depicts a combination of surface electrodes 1000, 1005 and 1010 and cased boreholes 1015 and 1020 in close proximity. In particular, surface electrode 1010 is used as part of an outer ring and is relatively close to second casing 1020. However, second casing 1020 is not connected to a transmitter 1025 and so does not form part of the source circuit. The idealized current paths for a surface source configuration are significantly disrupted by the presence of a borehole that has an electrically conductive casing. This is a particular problem for the annular surface source configurations shown in FIGS. 2 and 3. The conducting casing provides a conduit that guides the nominally surface current 200 of FIGS. 2 and 3 to a much deeper depth. This can be taken advantage of by replacing electrode 140 of FIGS. 2 and 3, which contacts casing 120, with one or more electrodes 1100 that are deployed at a surface 1105 near to a casing 1110, as illustrated in FIG. 11. Electric current flows in the earth between casing 1110 and electrode 1100, thereby completing the electrical circuit from a transmitter (not shown) to electrode 1116, through the earth to casing 1110, up casing 1110 and through the short section of earth to electrode 1100. Electrode 1100 can be deployed from 10 cm to 10 m or more from the casing. The further electrode 1100 is placed from casing 1110 the more current flows from electrodes 1115 and 1116 directly to electrode 1100 without passing deeper into the earth and up via casing 1110. Accordingly, electrode 1100 is preferably located less than 10 m and, more preferably, less than 3 m from casing 1110. An electrode is defined as being "at a borehole", in accordance with the invention, if the electrode is electrically coupled to the borehole so that more than 50% of the current input into the electrode passes through the outer surface of the borehole and into the earth.

Figure 12:
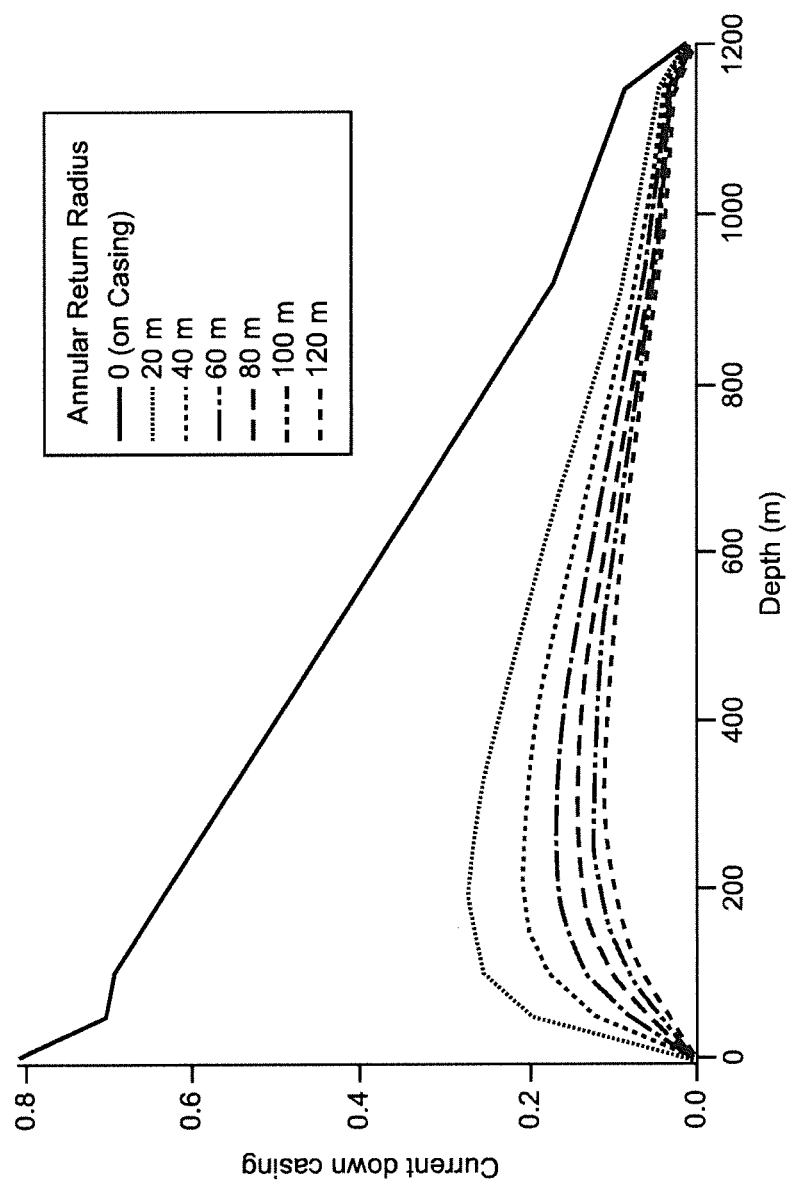
FIG. 12 plots a solution for the current flow down a conducting casing as a function of the lateral position of an inner surface electrode for the source configuration shown in FIG. 2.

FIG. 12 shows the distribution of current with depth along a conducting casing for the annular surface source as a function of the lateral distance from the casing of an electrode that moves from being in contact with the casing (i.e., electrode 140) to a non-trivial offset distance (i.e., electrodes 170 or 171). At 200 m deep, approximately 20% of the entire current flow is passing down the casing. In other words, only 80% remains at the surface. In practice it is found that the signal from the subsurface feature at formation depth can be 0.1% to 0.01% of the signal caused by an anomaly at the surface. Thus, a change of 20% in the surface current flow due to the casing would represent a change in the signal measured at the surface of 200 to 2000 times larger than the target subsurface signal of the formation. As a result, if a conducting casing is present, its effects should be accounted for.

Returning to FIG. 1, to detect a subsurface feature, and improve the detection thereof, the individual field amplitudes or phases of the signal relative to transmitter 145, recorded by each of sensors 155, are calculated assuming subsurface 110 is of uniform, or substantially uniform, bulk resistivity. These calculations include the presence of casing 120 if it is conducting. The value of the earth resistivity as a function of depth can, for example, be determined by standard well logging methods. This calculation is, in general, known as a forward model. Any deviation from the predicted field for any sensor 155 made by the forward model can be attributed to the presence of a resistivity anomaly, a formation signal, or both. This calculation can be improved by utilizing an estimate of the effect of resistivity anomalies in the vicinity of sensors 155. The forward model is calculated for a near surface survey configuration (e.g., FIGS. 2, 3 and 5) and the deep survey configuration that takes advantage of the borehole, and casing if present (e.g., FIG. 4). We term these models $M_S$ and $M_D$, respectively. To reduce the effect of near surface anomalies, if present, the value of the shallow surface data, $D_S$, at each location is multiplied by the ratio of the deep and shallow models, $M_D/M_S$. This product is then subtracted from the measured data, $D_D$, for the deep survey. The remaining data is defined as the formation data, $F_D$, because the contribution of surface information in it is much reduced compared to signals that originate at the target depth. Thus, $$F_D = D_D - (M_D/M_S)D_S$$

Figure 13:
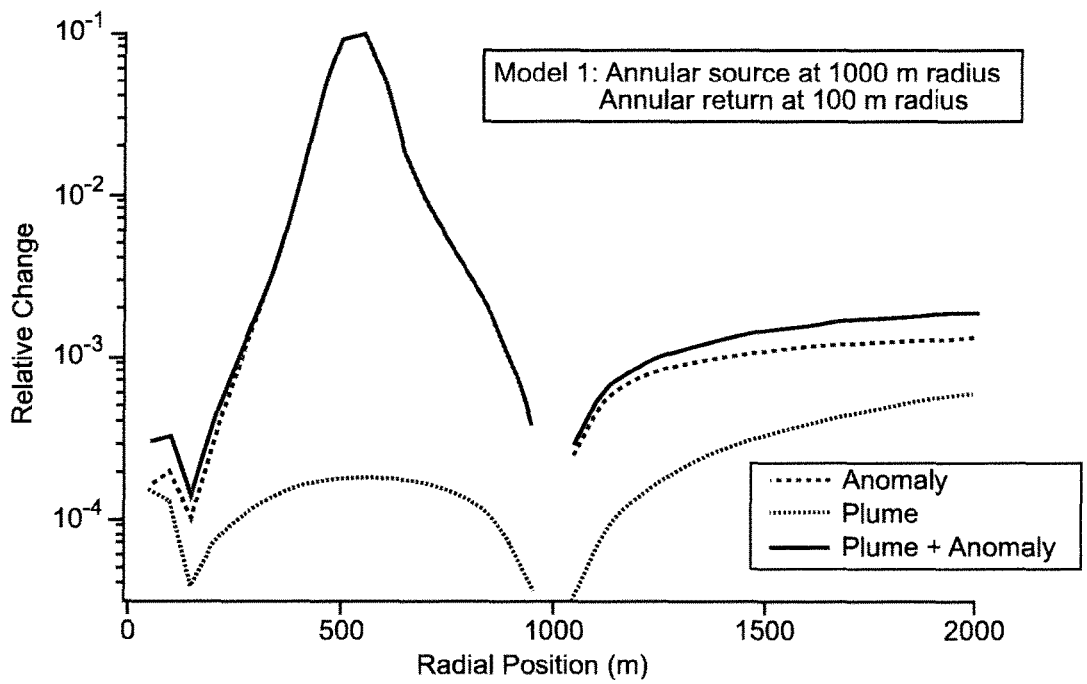
FIG. 13 plots calculated surface data for a shallow source configuration for three combinations of a surface anomaly and deep subsurface plume.
Figure 14:
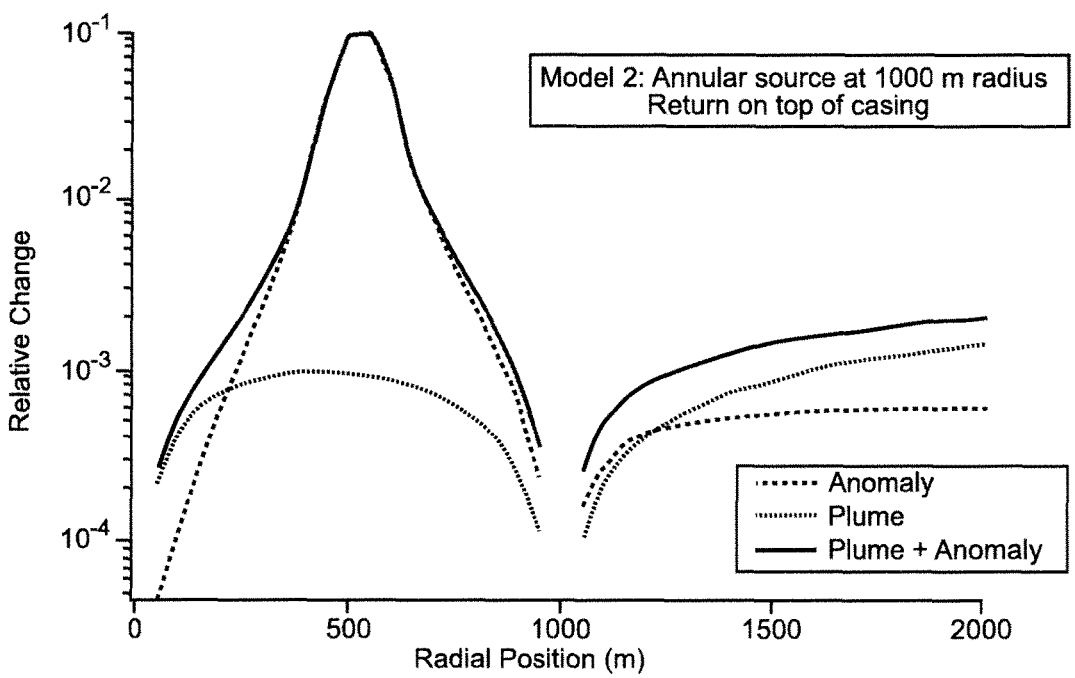
FIG. 14 plots calculated surface data for a deep source configuration for three combinations of a surface anomaly and deep subsurface plume.

An example of the operation of Equation 1 is shown in FIGS. 13 and 14. In the example, a well has a conducting casing of depth 1220 m and is used to illuminate a formation at depth 1140 m with only a connection at the top of the casing (e.g., electrode 140) and no downhole electrode (e.g., electrode 135). Data $D_S$ for an annular surface source configuration is shown in FIG. 13 and data $D_D$ for a deep source configuration is shown in FIG. 14. In this example, the radius of an inner electrode ring (e.g., ring 165) is 100 m and the radius of the outer ring (e.g., ring 175) is 1000 m. The data plotted in FIGS. 13 and 14 are divided by the surface field present for the uniform earth. Three scenarios are shown: a surface anomaly alone, a plume feature at formation depth alone, and the anomaly and plume together. As can be seen from the FIGS. 13 and 14, the relative plume signal is larger for the deep source data, $D_D$ (i.e., FIG. 14) than for the shallow source data $D_S$ (i.e., FIG. 13).

Figure 15:
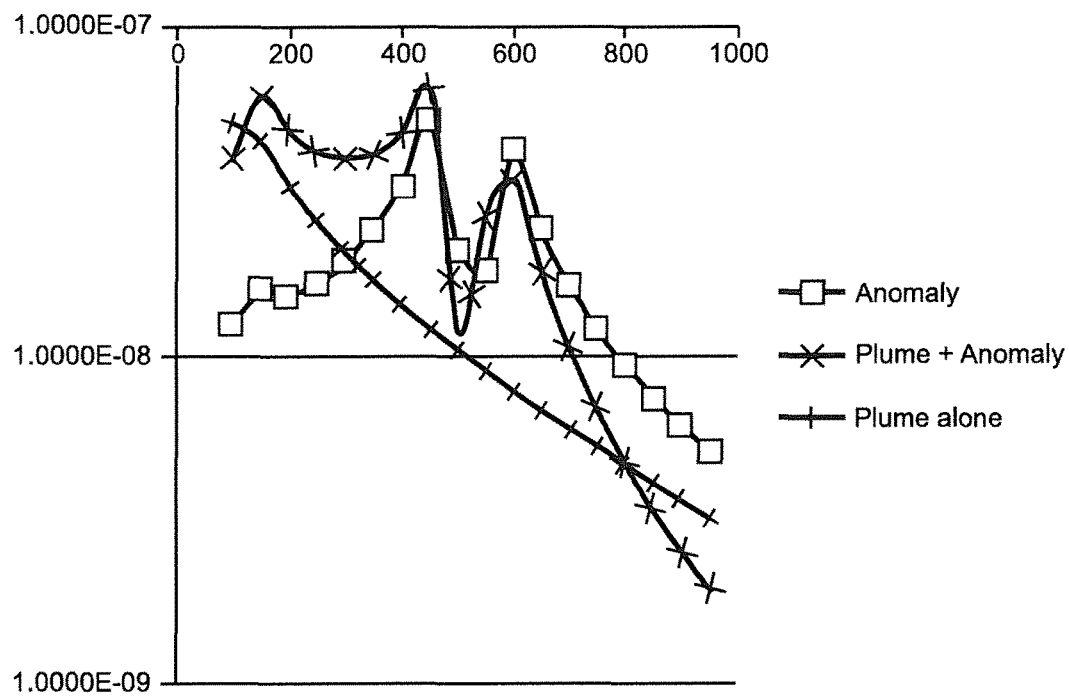
FIG. 15 plots the effect of using an equation to increase the plume signal relative to the anomaly using the scenarios illustrated in FIGS. 7 and 8.

In FIG. 15, the result of using Equation 1 is plotted. The signal for the plume alone is maintained. The plume extends to a radius of 50 m from the borehole and has the variation with distance that is normal for such a feature. The anomaly signal is reduced by a factor of 1000, compared to the $D_D$ data, and 10,000, compared to the $D_S$ data. The result for the plume and anomaly retains the maximum value of the plume out to 400 m. The surface anomaly in FIGS. 13, 14 and 15 is 50 m wide and located at a radius of 500 m. The narrow dip in the anomaly after processing via Equation 1 is characteristic of a shallow feature because of its narrow dipping shape.

Figure 16:
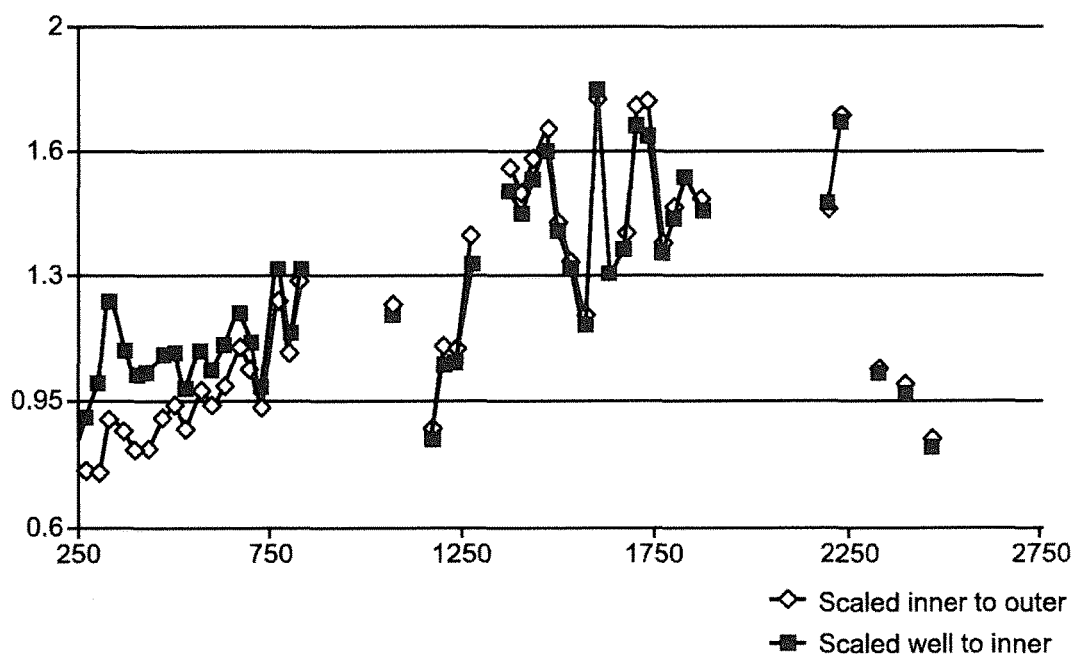
FIG. 16 plots scaled data (measured data divided by model data) for the well to outer and inner to outer electrode configurations.
Figure 17:
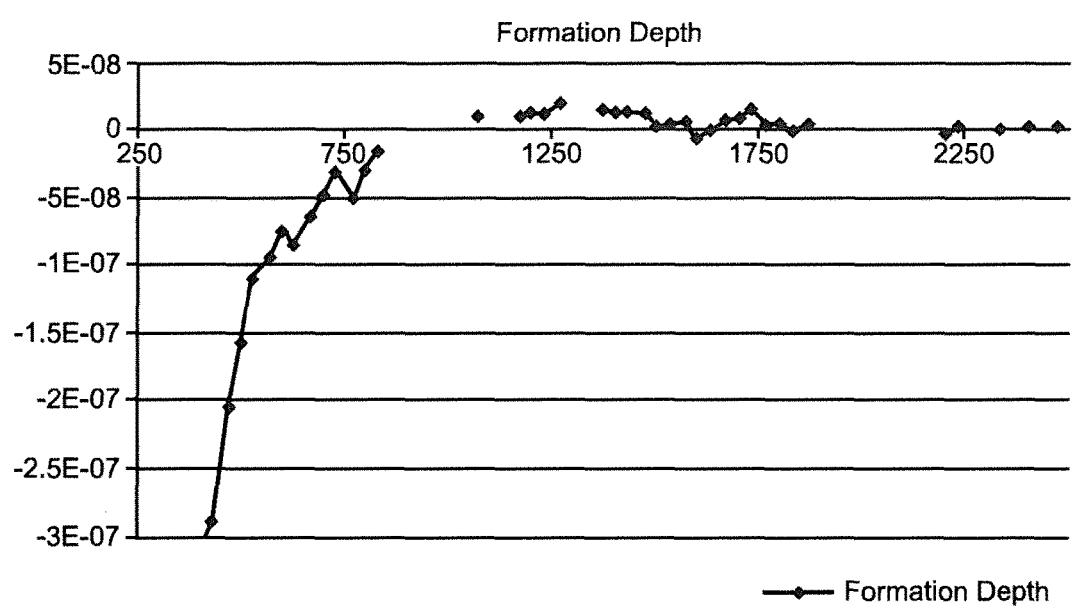
FIG. 17 plots data of FIG. 11 with an overburden signal subtracted in accordance with the present invention.

FIG. 16 shows experimental data from a field survey. The symbols labeled "scaled well to outer" were acquired using the source electrode configuration illustrated in FIG. 4 with only a top connection to a conducting casing (i.e., no downhole electrode 135). Thus, the current flows relatively deep into the earth to a depth on the order of the casing depth, which, in this case, is approximately 2.1 km. Four outer ring electrodes (generally corresponding to electrodes 180 and 181) were deployed at a radial distance of 2.5 km from the well. The symbols labeled "scaled inner to outer" were acquired using the source configuration shown in FIG. 2 in which four inner ring electrodes (generally corresponding to electrodes 170 and 171) were located 100 m from the top of the well and the same outer ring of electrodes at radius 2.5 km was used to complete the circuit. Each data set is scaled by its respective model result. Thus, the symbols labeled "scaled well to outer" are $D_D/M_D$ and the symbols labeled "scaled inner to outer" are $D_S/M_S$. As can be seen in FIG. 16, $D_D/M_D$ and $D_S/M_S$ change in an almost identical manner with radial distance from the well. This change is due to the presence of a number of resistivity anomalies. In FIG. 17, the result of using Equation 1 on the measured data used in FIG. 16 is plotted. The significant variation in $D_D$ is now corrected by subtracting the scaled difference in $D_S$, thereby significantly reducing the effect of resistivity anomalies at the surface.

As described herein, the present invention improves the accuracy of a borehole survey by providing an independent estimate of the effect of subsurface resistivity anomalies on an array of surface sensors. It is well known by those skilled in the art that additional sensors may be used to improve the utility of an electrical field measurement. For example, more than one component of the EM field at the surface can be acquired, and both electric field and magnetic fields can be measured. Accordingly, the method described herein may be combined with multiple sensor orientations and different electromagnetic fields. The electromagnetic signal that is produced by the subsurface current may be primarily characterized by a change in its amplitude, its phase relative to the transmitter, in the distribution of its frequency content, its coherence with other signals, its spatial correlation with other signals, some other property, or a combination of such properties. It is possible that the signal will be characterized by a machine learning algorithm and have no single clearly identified component. Additionally, one or more controllers (or control systems) are preferably provided to control and interact with the components of the system, such as the transmitter, electrodes, and sensors. The controller(s) can also perform the calculations related to the forward models, deep source data and shallow source data, for example.

Based on the above, it should be readily apparent that the present invention provides a system and method to separate a signal of interest, produced by a subsurface feature at depth within the earth, from a near surface anomaly. Although described with reference to preferred embodiments, it should be readily understood that various changes or modifications could be made to the invention without departing from the spirit thereof. In general, the invention is only intended to be limited by the scope of the following claims.

The invention claimed is:

1. A method for surveying a subsurface of the earth, with a system including at least one transmitter selectively connected to one or more of a first electrode located at a borehole and in electrical contact with the earth and second and third electrodes located at the surface of the earth, said method comprising:
    causing a current to flow at a deep depth within the subsurface, including causing a current to flow between the first and third electrodes, to acquire deep source data;
    causing a current to flow at a shallow depth within the subsurface, including causing a current to flow between the second and third electrodes, to acquire shallow source data; and
    combining the deep source data and the shallow source data;
    calculating a first model that includes earth resistivity as a function of depth based on the deep source data from the first and third electrodes;
    calculating a second model that includes earth resistivity as a function of depth based on the shallow source data from the second and third electrodes;
    calculating a ratio of the first model to the second model by dividing the first model by the second model, and
    calculating formation data by multiplying the ratio of the first model to the second model with the shallow source data and then subtracting this data from the deep source data wherein the combining and calculating steps are conducted with a controller.

2. The method of claim 1, wherein combining the deep source data and the shallow source data includes reducing the effect of a resistivity anomaly.

3. The method of claim 1, further comprising:
    locating the second and third electrodes to increase a common area covered by the current flowing at the deep depth and the current flowing at the shallow depth.

4. The method of claim 1, further comprising:
    locating the second electrode at a first distance from the borehole; and
    locating the third electrode at a second distance from the borehole, wherein the second distance is greater than the first distance.

5. The method of claim 1, further comprising:
    locating the second electrode on a first side of the borehole; and
    locating the third electrode on a second side of the borehole, wherein the first side is opposite the second side.

6. The method of claim 1, wherein a first electrode is located at a first borehole, a second electrode is located at a second borehole and at least one transmitter is connected to the first and second electrodes to cause current to flow between the first and second electrodes to acquire one of the deep and shallow source data.

7. A system for surveying a subsurface of the earth comprising:
    a first electrode located at a borehole, the first electrode being in electrical contact with the earth;
    a second electrode located at the surface of the earth; and
    at least one transmitter selectively connected to one or both of the first, second and third electrodes to cause a current to flow within the subsurface of the earth, wherein:
        when the at least one transmitter is connected to the first and third electrodes, a current is caused to flow at a deep depth within the subsurface, and the system is configured to acquire deep source data, and
        when the at least one transmitter is connected to the second and third electrodes, a current is caused to flow at a shallow depth within the subsurface, and the system is configured to acquire shallow source data; and
    a controller configured to
        combine the deep source data and the shallow source data,
        calculate a first model that includes earth resistivity as a function of depth based on the deep source data from the first and third electrodes,
        calculate a second model that includes earth resistivity as a function of depth based on the shallow source data from the second and third electrodes,
        calculate a ratio of the first model to the second model by dividing the first model by the second model, and
        calculate formation data by multiplying the ratio of the first model to the second model with the shallow source data and then subtracting this data from the deep source data.

8. The system of claim 7, wherein the controller is configured to combine the deep source data and the shallow source data to reduce the effect of a resistivity anomaly.

9. The system of claim 7, wherein the controller is configured to combine the deep source data and the shallow source data to reduce the effect of the area between the second and third electrodes on the deep source data.

10. The system of claim 7, wherein the second electrode is located at a first distance from the borehole, the third electrode is located at a second distance from the borehole and the second distance is substantially larger than the first distance.

11. The system of claim 10, wherein the second electrode is at least 50 m from the borehole or the third electrode is at least 500 m from the borehole.

12. The system of claim 7, wherein the second electrode is located on a first side of the borehole, the third electrode is located on a second side of the electrode and the first side is opposite the second side.

13. The system of claim 7, wherein the borehole constitutes a first borehole, the system further comprising a fourth electrode located at a second borehole, and, when the at least one transmitter is connected to the first and fourth electrodes, a current is caused to flow between the first and fourth electrodes to acquire the deep or shallow source data.

14. The system of claim 7, further comprising an array of electromagnetic sensors located at the surface of the earth.

\* \* \* \* \*